United States Patent [19]

Treace

[11] 3,790,249

[45] Feb. 5, 1974

[54] ILLUMINATING MEANS FOR OPERATING MICROSCOPE

[75] Inventor: Harry T. Treace, Germantown, Tenn.

[73] Assignee: Richards Manufacturing Company, Inc., Memphis, Tenn.

[22] Filed: Oct. 2, 1969

[21] Appl. No.: 863,062

[52] U.S. Cl. .................. 350/91, 350/96 B, 350/85, 240/37.1
[51] Int. Cl. ......................................... G02b 21/06
[58] Field of Search 240/2 MA, 37.1, 1.4; 350/96 R, 350/96 B, 82, 84, 85, 91; 351/16; 315/88

[56] References Cited
UNITED STATES PATENTS

| 1,692,232 | 11/1928 | Baker | 240/37.1 X |
| 1,987,532 | 1/1935 | Koito | 240/37.1 |
| 2,967,458 | 1/1961 | Stone | 350/85 X |
| 3,068,745 | 12/1962 | Peck | 351/16 |
| 3,186,300 | 6/1965 | Littman | 350/25 |
| 3,278,739 | 10/1966 | Royka et al. | 350/96 B X |
| 3,315,680 | 4/1967 | Silbertrust et al. | 350/96 B X |
| 3,357,423 | 12/1967 | Winchester et al. | 350/96 B X |
| 3,360,640 | 12/1967 | Seitz et al. | 350/96 B X |
| 3,382,353 | 5/1968 | Wappler | 350/96 B |
| 3,428,797 | 2/1969 | Haynes | 240/1.4 |

FOREIGN PATENTS OR APPLICATIONS

| 373,052 | 5/1932 | Great Britain | 240/37.1 |
| 1,097,127 | 12/1967 | Great Britain | 240/37 |
| 1,121,606 | 7/1968 | Great Britain | 240/37.1 |

*Primary Examiner*—David H. Rubin
*Attorney, Agent, or Firm*—John R. Walker, III

[57] ABSTRACT

An illuminating system for an operating microscope having a stand, a head assembly including an optical system and an arm supporting the head assembly. The illuminating system includes a light source located in spaced relationship to the head assembly and an elongated flexible fiber optic light guide having one end located adjacent the light source and the other end mounted on the head assembly for transmitting light from the light source to the head assembly for use in illuminating the operating area.

7 Claims, 8 Drawing Figures

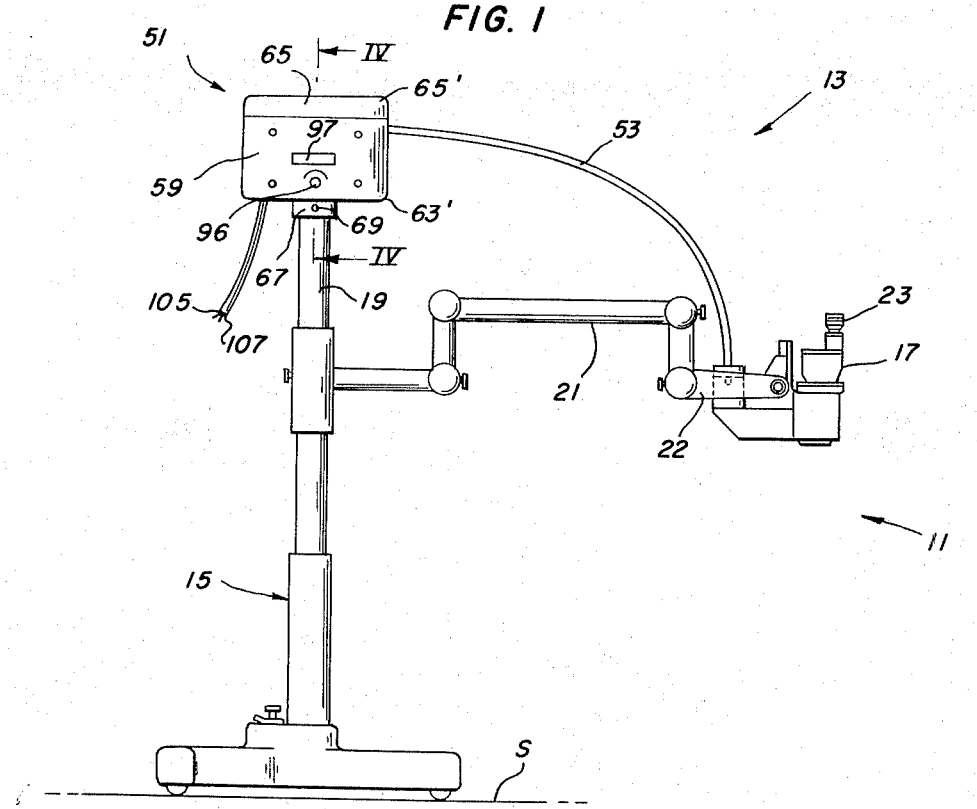
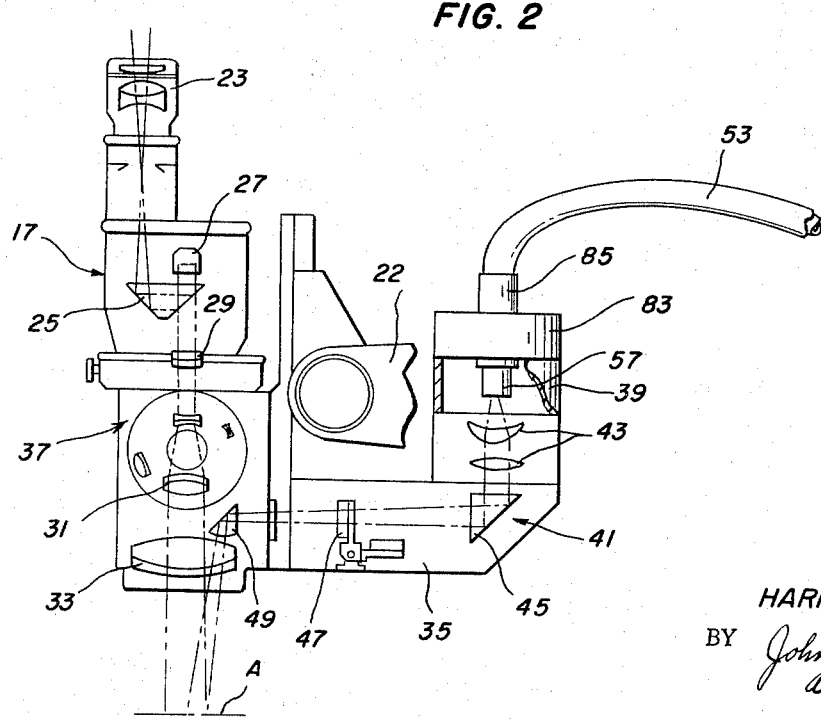

INVENTOR.
HARRY T. TREACE

ILLUMINATING MEANS FOR OPERATING MICROSCOPE

BACKGROUND OF THE INVENTION

1. Field of the Invention

This invention relates to an illuminating system for an operating microscope.

2. Description of the Prior Art

Heretofore, the typical operating microscope included in its lighting system an incandescent lamp for illuminating the operating area. These prior systems had numerous disadvantages including the following: (1) The heat from the incandescent lamp caused a drying out of the tissues which consequently many times necessitated a reduction in the operating interval. The incandescent lamp also caused heat in the face of the surgeon. (2) Many times the incandescent lamps burned out, causing an interrupation in the operation and the necessity for going into the sterile field. (3) There was an explosion hazard due to the incandescent lamp being mounted on the microscope head assembly and at a level at which the concentration of gases is dangerous. In other words, the incandescent lamp was mounted below the five foot level, the level below which is considered dangerous and above which is considered safe by the Underwriters' Laboratories or Bureau of Mine Safety.

In the Royka et al. Patent No. 3,278,739, a plurality of strands of fiber optic light guides are provided on the exterior of an upright conventional microscope which transmit the light from a light source. In this same patent there are provisions shown for attempting to eliminate explosion due to antiseptics and other explosive gases in a hospital. However, this is done by means of the light being in a hermetically selaed unit, as shown in FIG. 2 of Patent No. '739 with three strands 25 leading from the hermetically sealed unit to the place where the illumination is needed.

SUMMARY OF THE INVENTION

The present invention is directed towards overcoming the heretofore-mentioned and other disadvantages of illuminating systems for operating microscopes. The illuminating system of the present invention includes light source means located in spaced relationship to the head assembly of an operating microscope, an elongated fiber optic light guide means having one end located adjacent the light source and another end mounted in the head assembly of the operating microscope for transmitting light from the light source to the head assembly for use in illuminating an operating area. One of the features of the present invention is to mount the light source means in a housing which is mounted on top of the stand of the operating microscope above the five foot level whereby explosion hazards are overcome. Further, the housing is preferably cylindrically shaped with the corners being rounded to prevent injury in a dimly lit operating room.

The present invention is adapted to be fitted into the existing light guiding system of the present type of illuminating means in which an incandescent lamp is utilized on the head assembly of the operating microscope. Thus, with the illuminating system of the present invention an existing operating microscope can quickly and easily be converted to one in which the present invention is utilized, by removing the incandescent lamp from the receptacle on the existing operating microscope head assembly and replacing it with the cap of the present invention in which the end of the flexible optic light guide means is mounted and then mounting the heretofore mentioned housing on top of the stand of the existing operating microscope. It will, of course, be understood that, if desired, the present invention may be incorporated in the original manufacture of operating microscopes.

A further concept of the present invention is to provide, as said light source, first and second lamps with the first lamp being normally energized to provide light rays therefrom and with the light rays normally striking the end of the light guide means, and to provide means for energizing the second lamp to provide light rays when the first lamp burns out, and means for automatically directing the light rays from the second lamp into the end of the light guide means when the first lamp burns out. Thus, there is no need to go into the sterile field when one of the lights burns out, but rather the change will take place automatically to the second lamp without interrupting the operation.

Thus, with the use of the present invention in an operating room, the previous disadvantages of prior operating microscopes in which heat has been present have been overcome and there is very little, if any, heat transfer to the operating area. There is safety from explosion and the sterile conditions are maintained even if a lamp burns out, without causing any interruption of the operation.

BRIEF DESCRIPTION OF THE DRAWINGS

FIG. 1 is an operating microscope in which the illuminating system of the present invention is incorporated.

FIG. 2 is a somewhat schematic view of a portion of that shown in FIG. 1.

DESCRIPTION OF THE PREFERRED EMBODIMENTS

Figure 3:
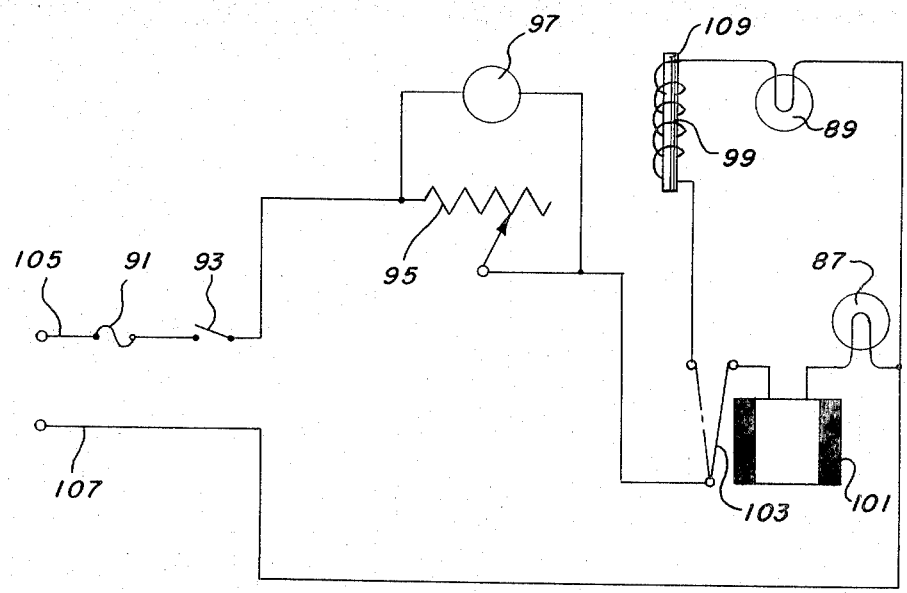
FIG. 3 is a schematic view of the circuit of the illuminating system of the present invention.

A typical operating microscope assembly 11 with which the illuminating system 13 of the present invention is adapted to be incorporated is best shown in FIGS. 1 and 2. The operating microscope assembly 11 includes the usual stand 15 which rests on the supporting surface S. The usual microscope head assembly 17 is supported from the vertical column structure 19 of stand 15 by an articulated arm assembly 21 including a yoke 22. The microscope head assembly 17 includes the usual pair of eyepieces 23 and suitable lens - prism system for viewing the operating area A, which system for example includes the prism 25, mirror 17, lens 29, the changeable lens assembly 31 for changing the magnification, and the objective lens 33. It will be understood that other suitable lens arrangements may be provided without departing from the spirit and scope of the present invention. Additionally, head assembly 17 includes a supplemental housing 35 which is attached to the main housing 37. The supplemental housing includes an upwardly opening cylindrical receptacle 39, which in previous microscope assemblies housed the incandescent lamp. In supplemental housing 35 is the usual lens-prism system 41 for directing the light through the objective lens 33 to the operating area. Light directing system 41 typically includes the lens 43, prism 45, changeable filter system 47, and prism 49. It will be understood that other light directing systems may be utilized without departing from the spirit and scope of the present invention.

It is contemplated that the illuminating system 13 of the present invention can be utilized to modify an existing operating microscope assembly 11 by simply removing the incandescent lamp, not shown, from receptacle 39 and replacing it quickly and easily with the illuminating system 13 of the present invention, as will be more apparent in the description to follow later in the specification. On the other hand, if desired, the illuminating system 13 can be built into the original manufacture of the operating microscope.

In general, the illuminating system 13 comprises a light source means or assembly 51 located remote from head assembly 17 on top of stand 15 and an elongated fiber optic light guide member 53 having one end 55 located adjacent light source assembly 51 and the other end 57 of the light guide member being mounted on head assembly 17 for transmitting light from the light source assembly 51 to the head assembly for use in illuminating the operating area.

Light source assembly 51 includes a housing 59 which preferably has a cylindrical sidewall 61, a circular bottom 63 integrally formed with sidewall 61 and a removable circular top 65 for gaining access into the interior of the housing. The top 65 is rounded on the corners as at 65' and the joint area between the bottom 63 and sidewall 61 is rounded as at 63'. Thus, with the cylindrical and rounded housing 59 there is little likelihood of injury to persons in a dimly lit operating room. Housing 59 is removably mounted on top of column structure 19 of stand 15 above the 5 foot level from supporting surface S, by means of the collar 67 which is fixedly attached to the lower surface of bottom 63. The collar 67 fits over the upper end of column 19 and is fixed thereon as by means of the set screw 69.

The end 55 of light guide member 53 is located in housing 59 and extends outwardly through an aperture 71 in the sidewall 61 of housing 59. A suitable flanged connector 73 is provided in aperture 71 to retain the guide member 53 and provide a means for grounding the shielded cable 75 which preferably covers the intermediate portion of light guide member 53. The light guide member 53 is of known construction, as for example, of the construction disclosed in the heretofore-mentioned U.S. Patent No. 3,278,739. Thus, the light guide member is flexible and includes a plurality of plastic or glass fibers 77 non-coherently arranged in a flexible plastic jacket 79 and which are preferably in a shielded cable 75. The fibers 77 are preferably polished off at the terminating ends thereof and at the end 55 a lens 81 is preferably provided. Thus, lens 81 can be formed of plastic or glass and adhered to the ends of the polished fibers 77 as by epoxy. It will be understood that the light travels through light guide member 53 from end 55 and out the end 57 where it is projected onto the lens 43 and through the light-directing system 41 to the operating area A. The retaining means for end 57 is preferably a circular caplike member 83 which fits into receptacle 39. The light guide member 53 extends through a central bore of the caplike member 83 and is held therein by suitable means, as by friction or otherwise. Preferably, caplike member 83 is metallic and includes a reduced portion 85 to which the shield 75 of light guide member 53 is connected, thereby grounding the parts.

Figure 4:
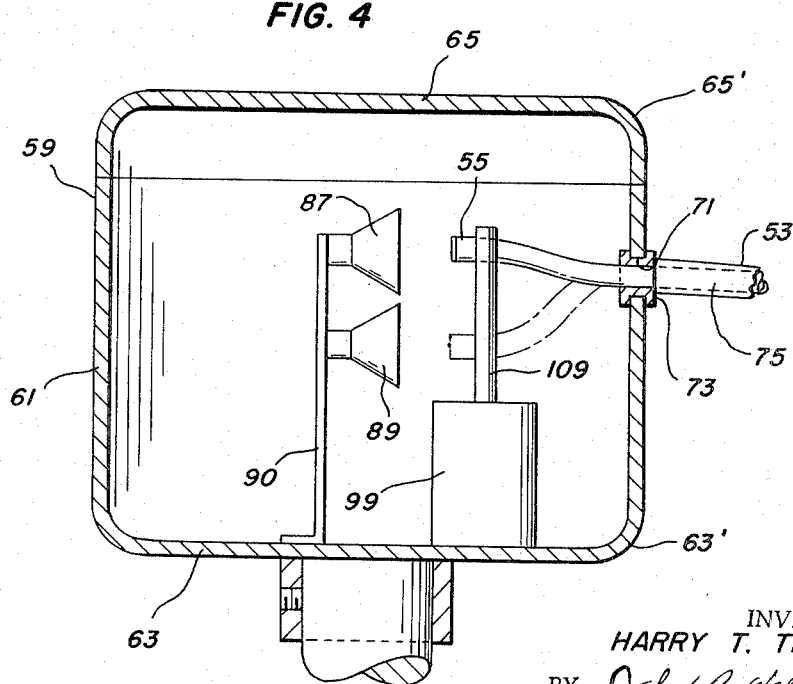
FIG. 4 is an enlarged somewhat schematic sectional view taken as on the line IV—IV of FIG. 1.

Referring now to FIGS. 3 and 4, light source assembly 51 preferably includes a first lamp 87 and a second lamp 89 supported in housing 59 by suitable means, as holder 90. The lamps 87, 89 are arranged preferably in vertical alignment and pointed generally in the same direction, with the light rays which emanate therefrom (when the lamps are energized) being in generally parallel relationship. Normally, first lamp 87 is energized and is directed towards the end 55 of light guide member 53 so that the light rays from first lamp 87 are received by the light guide member to be directed by the light guide member as heretofore described. When first lamp 87 burns out, second lamp 89 is automatically turned on and end 55 is automatically shifted into the broken line position shown in FIG. 4 in front of second lamp 89 so that the light rays from the second lamp are directed into the end 55 of light guide member 53 without interruption of the operation. The circuit and components for causing this automatic shifting are shown schematically in FIG. 3. The components in this circuit include a fuse 91, an off-on switch 93, a rheostat 95, a meter 97, a solenoid 99, and a relay 101 having a relay switch 103. The conduits 105, 107 are connected to a suitable source of electricity, not shown. It will be understood that when switch 93 is closed, the lamp 87 will be energized and the relay switch 103 will remain in the normal first position shown in solid lines so long as the first lamp 87 is burning. When first lamp 87 burns out, the relay switch 103 will move to the second position shown in broken lines under the influence of suitable means as a spring, not shown, to cause the second lamp 89 to be energized and the current to flow through solenoid 99. This causes the arm 109 of the solenoid 99 to retract downwardly and move the end 55 of light guide member 53, which is attached thereto, downwardly into the broken line position shown in FIG. 4 in front of the second lamp 89. Thus, the end 55 and the lamps 87, 89 are shifted relative to one another by shifting the end 55. It will be understood that rheostat 95, which has a knob 96 attached thereto extending on the outside of housing 59, may be turned to adjust the illumination of lamps 87, 89.

Figure 6:
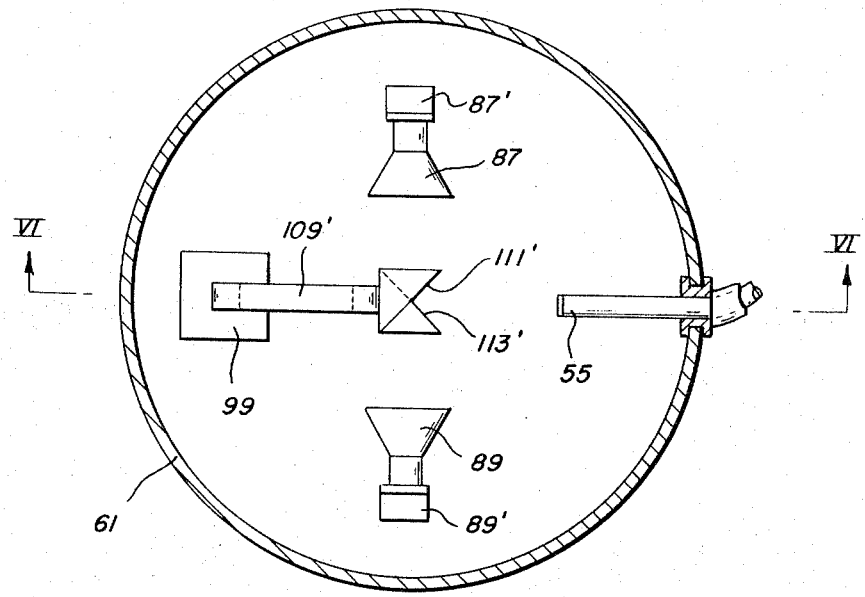
FIG. 6 is a sectional view taken as on the line VI—VI of FIG. 5.
Figure 5:
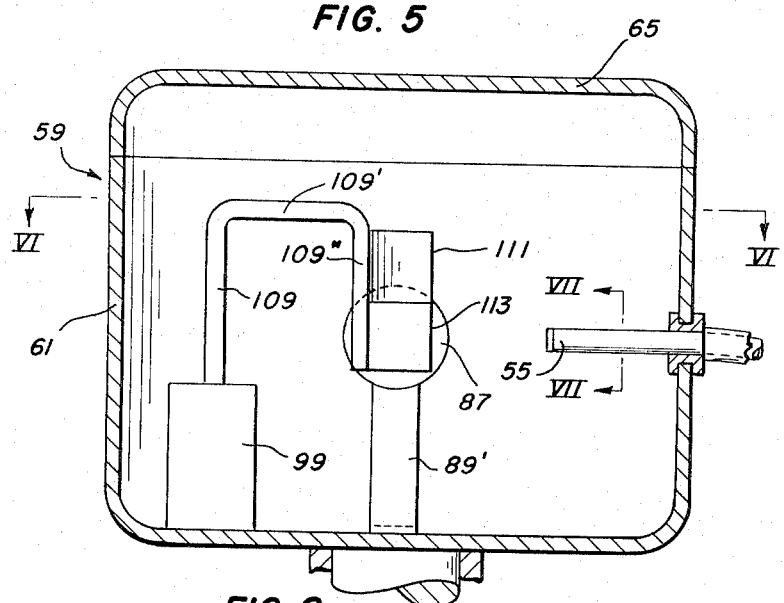
FIG. 5 is a view similar to FIG. 4 of an alternate means for relatively shifting the light rays and the end of the fiber optic guide means.
Figure 7:
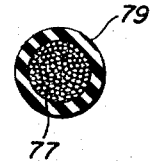
FIG. 7 is a sectional view through the fiber optic light guide.
Figure 8:
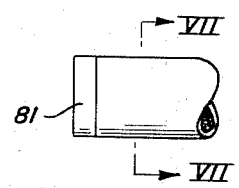
FIG. 8 is an elevational view of one end of the optic light guide.

Another means for causing the above-mentioned relative shifting is shown in FIGS. 5 and 6, wherein it will be seen that instead of shifting the end 55, the light rays from the lamps 87, 89 are shifted by energizing the solenoid 99. In this embodiment shown in FIGS. 5 and 6, the arm 109 of the solenoid is extended as at 109' into the shape shown to provide a vertically depending portion 109'' upon which is mounted a pair of mirrors 111, 113. The mirrors 111, 113 are preferably formed triangular in shape with one of the surfaces thereof being provided with a mirrored finish as at 111', 113'. Also, the reflecting surfaces 111', 113' of the mirrors 111, 113 are disposed in perpendicular relationship one above the other, as best seen in FIG. 6. The lamps 87, 89 are supported by suitable means, as holders 87', 89' and are arranged facing toward each other with first lamp 87 normally being energized as in the first embodiment by the same circuit means shown in FIG. 3. When first lamp 87 is energized, arm 109 is in an upper position so that reflecting surface 113' is in alignment with first lamp 87 and directs the rays therefrom into the end 55. Then, when lamp 87 burns out, the solenoid 99 will retract arm 109 in the same manner as in the first embodiment and will move refelcting surface 111' into alignment with second lamp 89 to reflect the light rays therefrom into the end 55.

Although the invention has been described and illustrated with respect to preferred embodiments thereof, it is to be understood that it is not to be so limited since changes and modifications may be made therein which are within the full intended scope of this invention.

I claim:

1. The combination with an operating microscope assembly having a floor stand supported on a surface, a head assembly including an optical system and a light directing system including light collecting lens and means for directing light collected by said lens onto an operating area and an arm supporting said head assembly; of an illuminating system comprising light source means located at a substantial distance spaced from said head assembly and above a predetermined level that is safe against explosion hazards, unitary elongated fiber optic light guide means having one end located adjacent said light source receiving the light rays from said light source and another end mounted on said head assembly adjacent said light collecting lens directing the light received from said light source to said light collecting lens from where the light is then directed by said light directing system to the operating area.

2. The apparatus of claim 1 in which said light source in said one end of said light guide means is mounted at the top of said stand at least 5 feet above the supporting surface of said stand.

3. The apparatus of claim 1 which includes a cylindrical housing having rounded corners and in which said light source and said one end of said light guide means are mounted.

4. In an operating microscope assembly having a stand supported on a surface, a head assembly including an optical system and a light directing system including light collecting lens, a light receptacle, and means for directing light collected by said lens onto an operating area; an illuminating system comprising a housing mounted on said stand above a predetermined height that is safe against explosion hazards, a first lamp and a second lamp mounted in said housing, means normally energizing said first lamp to provide light rays therefrom, unitary elongated fiber optic light guide means having one end located in said housing to receive the light rays form said first lamp and having the other end located adjacent said light collecting lens for transmitting the light received from said first lamp to said light collecting lens whereby the light is then directed by said light directing system to the operating area, cap means retaining said other end of said light guide means and removably mounted in said receptacle to hold said other end in place, means for energizing said second lamp to provide light rays when said first lamp burns out, and means for automatically relatively shifting said one end of said light guide means and the light rays from said second lamp into position so that the light rays from said second lamp are received by said one end of said light guide means when said first lamp burns out.

5. The apparatus of claim 4 in which said housing is mounted at the top of said stand at least 5 feet above the supporting surface of said stand.

6. The apparatus of claim 5 which includes a cylindrical housing having rounded corners and in which said light source and said one end of said light guide means are mounted.

7. An illumination system for an operating microscope having a stand, a head assembly including an optical system and a light directing system, and an arm supporting said head assembly; said illumination system comprising light source means for location in spaced relationship to said head assembly, said illumination system comprising a housing and means for mounting said housing on said stand, light source means mounted in said housing, cap means for attachment to said head assembly, and unitary elongated flexible fiber optic light guide means having one end mounted in said housing adjacent said light source means and the other end mounted in said cap means for transmitting light from said light source means to the light directing system for use in illuminating the operating area.

* * * * *